United States Patent
Kurihara et al.

(10) Patent No.: US 11,110,872 B2
(45) Date of Patent: Sep. 7, 2021

(54) POWER CONTROL DEVICE FOR VEHICLE

(71) Applicant: Mazda Motor Corporation, Hiroshima (JP)

(72) Inventors: Takeshi Kurihara, Hiroshima (JP); Yusuke Nakano, Hiroshima (JP); Hidemasa Tomiyori, Aki-gun (JP); Yukihiro Soeda, Hiroshima (JP); Akina Inagaki, Hiroshima (JP); Yuta Otsuka, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/839,352

(22) Filed: Apr. 3, 2020

(65) Prior Publication Data
US 2020/0377044 A1    Dec. 3, 2020

(30) Foreign Application Priority Data

May 28, 2019   (JP) .............................. JP2019-099050

(51) Int. Cl.
  *B60R 16/033*      (2006.01)
  *B60W 10/26*      (2006.01)
  (Continued)

(52) U.S. Cl.
  CPC .......... *B60R 16/0307* (2013.01); *B60L 58/20* (2019.02); *B60R 16/033* (2013.01); *B60W 10/26* (2013.01)

(58) Field of Classification Search
  CPC .. B60L 1/003; B60L 1/006; B60L 1/02; B60L 1/04; B60L 1/08; B60L 1/10; B60L 1/12; B60L 1/20; B60L 50/10–16; B60L 50/50–52; B60L 50/60; B60L 50/61; B60L 53/20–24; B60L 58/10; B60L 58/18; B60L 58/20; B60L 2210/10–14; B60R 16/0307; B60R 16/033; B60W 10/26

See application file for complete search history.

(56) References Cited

U.S. PATENT DOCUMENTS 6,430,482 B1 * 8/2002 Wakashiro .......... B60L 15/2045
                                                        701/22
6,476,571 B1 * 11/2002 Sasaki ................... B60W 10/08
                                                       318/139

(Continued)

FOREIGN PATENT DOCUMENTS

JP      2016118126 A     6/2016

*Primary Examiner* — Levi Gannon
(74) *Attorney, Agent, or Firm* — Alleman Hall Creasman & Tuttle LLP (57) ABSTRACT

A power control device for a power supply mounted on a vehicle is provided, which includes a generator mounted on the vehicle and configured to regenerate power from kinetic energy of the vehicle, a high-voltage battery configured to accumulate the power regenerated by the generator, a low-voltage battery of which a nominal voltage is lower than the high-voltage battery, a voltage converter configured to lower an output voltage from the high-voltage battery and charge the low-voltage battery at the lower voltage, and a controller configured to control the voltage converter. The controller operates the voltage converter to start the charging of the low-voltage battery after the vehicle is powered ON and before an engine mounted on the vehicle is started.

13 Claims, 5 Drawing Sheets

(51) Int. Cl.
*B60R 16/03* (2006.01)
*B60L 58/20* (2019.01)

(56) References Cited

U.S. PATENT DOCUMENTS

| | | | |
|---|---|---|---|
| 2001/0041952 A1* | 11/2001 | Nada | B60L 7/14 |
| | | | 701/22 |
| 2009/0079262 A1* | 3/2009 | Ohtomo | B60L 53/11 |
| | | | 307/10.6 |
| 2016/0290304 A1* | 10/2016 | Yukawa | B60L 58/20 |
| 2017/0259803 A1* | 9/2017 | Khafagy | B60W 20/13 |
| 2017/0259808 A1* | 9/2017 | Makled | B60W 20/20 |
| 2018/0050685 A1* | 2/2018 | Atluri | B60K 6/40 |
| 2018/0072302 A1* | 3/2018 | Iwashita | B60W 10/08 |
| 2018/0162361 A1* | 6/2018 | Choi | B60W 10/08 |
| 2019/0267919 A1* | 8/2019 | Suzuki | B60L 58/12 |
| 2020/0072178 A1* | 3/2020 | Berkson | F02N 11/0866 |

\* cited by examiner

POWER CONTROL DEVICE FOR VEHICLE

TECHNICAL FIELD

The present disclosure relates to a power control device for a vehicle, and particularly to a control device for a power supply mounted on the vehicle.

BACKGROUND OF THE DISCLOSURE

JP2016-118126A discloses an engine stop control device. The engine stop control device is provided with a first power storage part and a second power storage part. When power beyond what is required for starting an engine is not stored in the second power storage part, a generator charges the second power storage part, and the engine is stopped after the necessary power is stored. In addition, the engine stop control device actuates a DC-DC converter according to charged states of the first power storage part and the second power storage part, and charges the first power storage part at a low-voltage side after the voltage of the power accumulated in the second power storage part at a high-voltage side is reduced.

Like JP2016-118126A, power control devices for vehicles are known in which two power storage parts with different operating voltages are provided, a DC-DC converter is actuated according to the charged states of the power storage parts, and the power accumulated in the power storage parts are transferred from one side to another to efficiently utilize the power. For example, a power unit for vehicles provided with a high-voltage battery and a low-voltage battery, and a power unit for vehicles provided with a capacitor and a lead battery which is a low-voltage battery, as the first and second power storage parts, are known. In these power units, a portion of the power accumulated in the high-voltage power storage part or the power generated by a motor generator is reduced in voltage by using the DC-DC converter after an engine startup, and is supplied to the lead battery or various electrical loads.

However, after the vehicle is powered ON (after turning an ignition switch to an "ON" position) and before the engine is started, electric apparatuses mounted on the vehicle may be used for a comparatively long period of time, and in such a case, a problem arises in that the electrical energy accumulated in the low-voltage battery runs out. Moreover, if the vehicle is operated in a state where the high-voltage battery is fully-charged, electrical energy regenerated by the generator cannot be accumulated in the high-voltage battery, and therefore, there is a problem in that the regenerated electric energy cannot effectively be utilized.

SUMMARY OF THE DISCLOSURE

Therefore, the present disclosure is made in view of the above situation, and one purpose thereof is to provide a power control device for a vehicle, capable of fully using in-vehicle electric apparatuses and effectively utilizing electrical energy regenerated by a generator, even before the engine is started.

According to one aspect of the present disclosure, a power control device for a power supply mounted on a vehicle is provided, which includes a generator mounted on the vehicle and configured to regenerate power from kinetic energy of the vehicle, a high-voltage battery configured to accumulate the power regenerated by the generator, a low-voltage battery of which a nominal voltage is lower than the high-voltage battery, a voltage converter configured to lower an output voltage from the high-voltage battery and charge the low-voltage battery at the lowered voltage, and a controller configured to control the voltage converter. The controller operates the voltage converter to start the charging of the low-voltage battery after the vehicle is powered ON and before an engine mounted on the vehicle is started.

According to this configuration, the generator regenerates the power from the kinetic energy of the vehicle, and the generated power is accumulated in the high-voltage battery. The voltage converter lowers the output voltage from the high-voltage battery, and charges at the lowered voltage the low-voltage battery of which the nominal voltage is lower than the high-voltage battery. The controller operates the voltage converter to start charging the low-voltage battery after the vehicle is powered ON and before the engine mounted on the vehicle is started.

According to this configuration, since the voltage converter is operated and the charging of the low-voltage battery is started after the vehicle is powered ON and before the engine is started, the low-voltage battery can be prevented from being insufficiently charged, even if in-vehicle electric apparatuses are used for a comparatively long period of time before the engine startup. Moreover, according to this configuration, before the mounted engine is started, the voltage converter is operated and the output voltage from the high-voltage battery is lowered to charge the low-voltage battery. Therefore, even when the high-voltage battery is fully-charged, the high-voltage battery still has the capacity to be charged when starting the engine and it becomes possible to charge the high-voltage battery with the power regenerated during the operation of the vehicle, thereby effectively utilizing the regenerated power.

The controller may inhibit the voltage converter from starting the charging of the low-voltage battery, when the voltage of the high-voltage battery is below a given voltage while the vehicle is powered ON.

According to this configuration, while the vehicle is powered ON, if the voltage of the high-voltage battery is below the given voltage, since the charging of the low-voltage battery by the voltage converter is not started, the high-voltage battery being insufficiently charged due to charging the low-voltage battery can be avoided.

The controller may control the voltage converter so that an output current from the voltage converter becomes below a given maximum current after the engine is started, and restrict the output current below a given first current lower than the maximum current after the vehicle is powered ON and before the engine is started.

In general, the voltage converter generates power by outputting a large current. Thus, when the voltage converter outputs the large current for a comparatively long period of time, its temperature rises, and therefore, the output current cannot avoid being lowered to protect the voltage converter. According to this configuration, after the vehicle is powered ON and before the engine is started, since the output current from the voltage converter is restricted to or below the given first current which is lower than the maximum current, excessive increase of the temperature of the voltage converter before the engine is started can be prevented. Therefore, it can be prevented that it becomes impossible to supply the required current from the voltage converter during the operation of the vehicle after the engine is started.

The controller may control the voltage converter so that the charging of the low-voltage battery from the high-voltage battery is suspended while cranking is performed after the vehicle is powered ON.

In general, when the cranking is performed, a comparatively large current is needed to drive a starter motor. According to this configuration, in the state where the cranking is performed, since the charging of the low-voltage battery from the high-voltage battery is suspended, the current being excessively drawn from the high-voltage battery and the excessive voltage drop, etc. can be prevented from occurring.

The power control device may further include a relay device configured to switch between a connected state and a disconnected state of the high-voltage battery and the voltage converter, and a hood sensor configured to detect an open state and a closed state of a hood of the vehicle. The controller may switch the relay device to the disconnected state or maintain the relay device in the disconnected state, when the open state of the hood is detected by the hood sensor after the vehicle is powered ON.

When the hood of the vehicle is in the open state, it is considered that maintenance of the vehicle, such as an update of the control program of the power control device, is to be performed. However, if the voltage converter is operated and the charging of the low-voltage battery is performed after the vehicle is powered ON and before the engine is started, a part of the maintenance cannot be performed. According to this configuration, when the open state of the hood is detected by the hood sensor, since the relay device which switches connection/disconnection of the voltage converter to the high-voltage battery is switched to the disconnected state, the maintenance of the vehicle can be prevented from being impeded.

The controller may increase a target voltage when operating the voltage converter to charge the low-voltage battery after the vehicle is powered ON and before the engine is started.

According to this configuration, by increasing the target voltage of the low-voltage battery while the power is turned ON, the amount of charge to the low-voltage battery from the high-voltage battery increases and the high-voltage battery has more capacity to be charged, thereby effectively utilizing the regenerated power.

According to another aspect of the present disclosure, a method of controlling a power supply for a vehicle is provided, which includes the steps of regenerating power from kinetic energy of the vehicle, accumulating the regenerated power in a high-voltage battery having a higher nominal voltage than a low-voltage battery, lowering, by a voltage converter, an output voltage from the high-voltage battery and charging the low-voltage battery at the lowered voltage, and controlling the voltage converter to start the charging of the low-voltage battery after the vehicle is powered ON and before an engine mounted on the vehicle is started.

DETAILED DESCRIPTION OF THE DISCLOSURE

Next, a power control device for a vehicle according to one embodiment of the present disclosure is described with reference to the accompanying drawings.

[Device Configuration]

Figure 1:
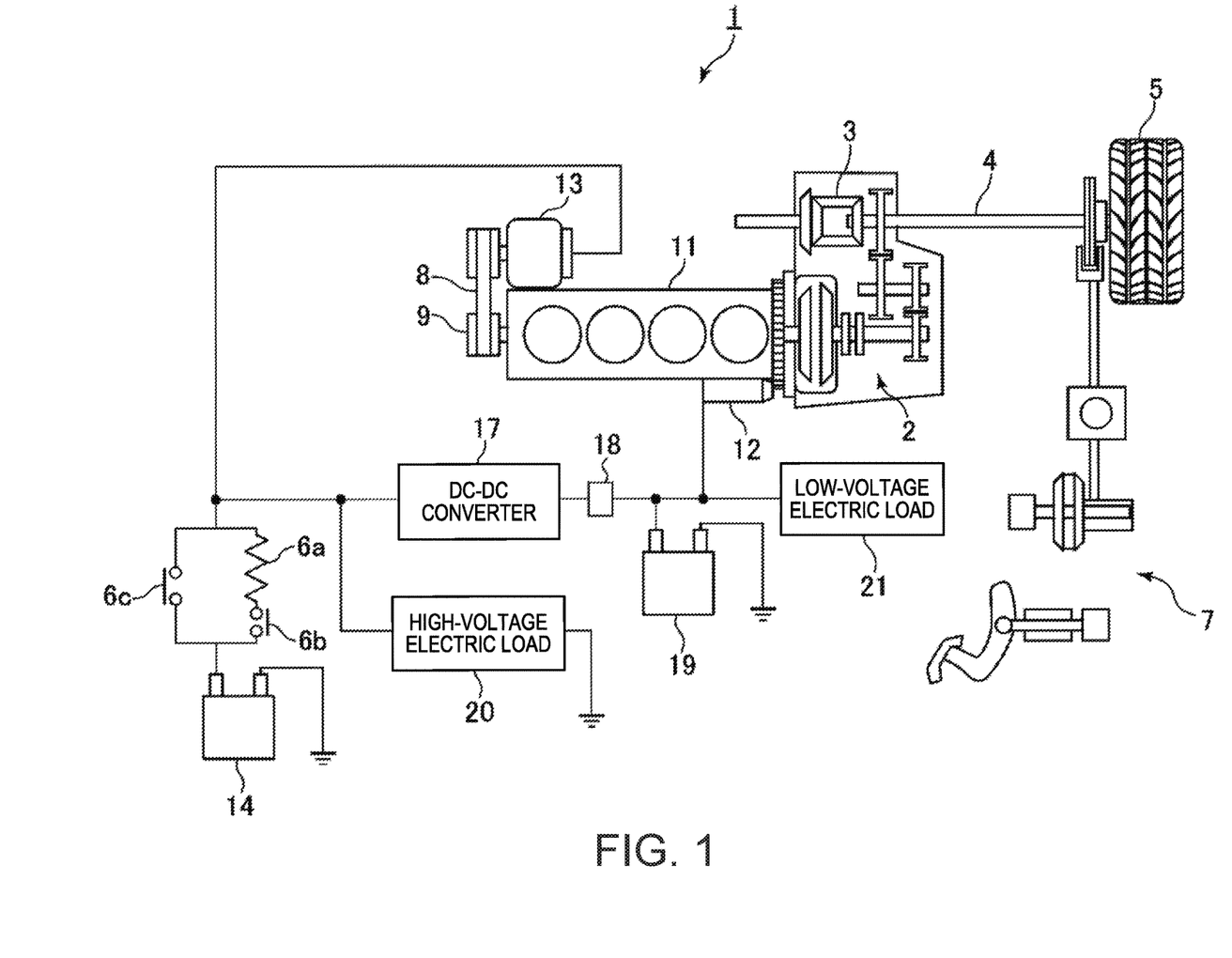
FIG. 1 is a block diagram schematically illustrating the overall configuration of a hybrid vehicle to which a power control device for a vehicle according to one embodiment of the present disclosure is applied.

First, a device configuration of the power control device according to this embodiment of the present disclosure is described. FIG. 1 is a block diagram schematically illustrating the overall configuration of a hybrid vehicle to which the power control device according to this embodiment of the present disclosure is applied. As illustrated in FIG. 1, a hybrid vehicle 1 mainly includes an engine 11, a gear-driven starter 12, an ISG (Integrated Starter Generator) 13, a lithium ion battery 14, a DC-DC converter 17 that is a voltage converter, a lead storage battery 19, a high-voltage electrical load 20, and a low-voltage electrical load 21. Below, since the voltage (nominal voltage) of the lithium ion battery 14 is higher than the voltage (nominal voltage) of the lead storage battery 19, the lithium ion battery 14 is suitably referred to as a "high-voltage battery 14," and the lead storage battery 19 is suitably referred to as a "low-voltage battery 19."

The engine 11 is an internal combustion engine (a gasoline engine or a diesel engine) which generates a driving force for the hybrid vehicle 1. The driving force of the engine 11 is transmitted to wheels 5 through an output shaft 9, a transmission 2, a reduction gear 3, and a drive shaft 4. The output shaft 9 of the engine 11 is coupled to the gear-driven starter 12 through gears. The gear-driven starter 12 starts the engine 11 by using power supplied from the low-voltage battery 19, when an ignition switch 22 (FIG. 2) is turned ON by a driver. Moreover, the hybrid vehicle 1 has a brake system 7 for giving a braking force according to operation of a brake pedal by a driver to the vehicle 1. This brake system 7 is comprised of an electric brake.

The ISG 13 is a motor generator provided with a power generation function for generating power by being driven by the engine 11, and an electric drive function for generating a driving force for the hybrid vehicle 1. The ISG 13 is coupled to the output shaft 9 of the engine 11 through a belt 8. Moreover, the ISG 13 is electrically connected to the high-voltage battery 14 through a resistor 6a and switch elements 6b and 6c. These switch elements 6b and 6c function as relay devices which change connection/disconnection of the DC-DC converter 17 with the high-voltage battery 14. When first connecting the ISG 13 with the high-voltage battery 14, the switch element 6b on the side where the resistor 6a is provided is turned ON to prevent damage of the electronic components by inrush current, etc. Then, the switch element 6c is turned ON to maintain the connection between the ISG 13 and the high-voltage battery 14.

Moreover, when the ISG 13 operates for the power generation function, it functions as a generator which generates power by rotating a rotor which rotates in a magnetic field while being interlocked with the output shaft 9 of the engine 11. The ISG 13 has a rectifier (not illustrated) therein and converts the generated AC power into DC power by using the rectifier. The power generated by the ISG 13 is supplied to the high-voltage battery 14 and charges it, or is supplied to the high-voltage electric load 20. On the other hand, when the ISG 13 operates for the electric drive function, it drives the output shaft 9 of the engine 11 through the belt 8 by using the power stored in the high-voltage battery 14. Note that in order to adjust the tension of the belt 8, for example, when switching the ISG 13 between the operation for the power generation function and the operation for the electric drive function, a pendulum type variable tension tensioner (decoupling alternator tensioner) may be applied to the belt 8.

The high-voltage battery 14 includes a plurality of lithium ion batteries connected in series, and the low-voltage battery 19 includes a plurality of lead storage batteries connected in series. For example, the nominal voltage of the high-voltage battery 14 is 24 VDC, and the nominal voltage of the low-voltage battery 19 is 12 VDC. Since the high-voltage battery 14 and the low-voltage battery 19 store electric energy by way of a chemical reaction, they are not suitable for rapid charge and discharge, but they have a characteristic of being able to store a comparatively large amount of power because they are easily able to secure charge capacities.

The DC-DC converter 17 is provided between the high-voltage battery 14 and the low-voltage battery 19. The DC-DC converter 17 outputs the input voltage after it changed the voltage, for example, by ON/OFF switching of the built-in switching element. In detail, the DC-DC converter 17 lowers the output voltage of the high-voltage battery 14 and supplies it to the low-voltage battery 19 to charge the low-voltage battery 19. For example, the DC-DC converter 17 lowers the voltage of about 24 VDC supplied from the high-voltage battery 14 to about 12 VDC and outputs it to the low-voltage battery 19. Moreover, the output of the DC-DC converter 17 is connected to a converter output current sensor 18 which is a current sensor for detecting an output current from the DC-DC converter 17. Currents supplied to the low-voltage battery 19, the low-voltage electric load 21, etc. from the DC-DC converter 17 flow through the converter output current sensor 18 which can measure the sum total value of these currents.

The high-voltage electric load 20 is an electric load which operates, for example, at the voltage of about 24 VDC, and the low-voltage electric load 21 is an electric load which operates, for example, at the voltage of about 12 VDC, which is lower than that of the high-voltage electric load 20. At least one of the power generated by the ISG 13 and the power charged in the high-voltage battery 14 is supplied to the high-voltage electric load 20. Moreover, at least one of the power which is generated by the ISG 13, charged in the high-voltage battery 14, and lowered in the voltage by the DC-DC converter 17, and the power charged in the low-voltage battery 19 is supplied to the low-voltage electric load 21. In one example, the high-voltage electric load 20 includes a heater (a seat heater, etc.), the low-voltage electric load 21 includes an electrically assisted power steering system (EAPS), an air-conditioner, and an audiovisual apparatus.

Figure 2:
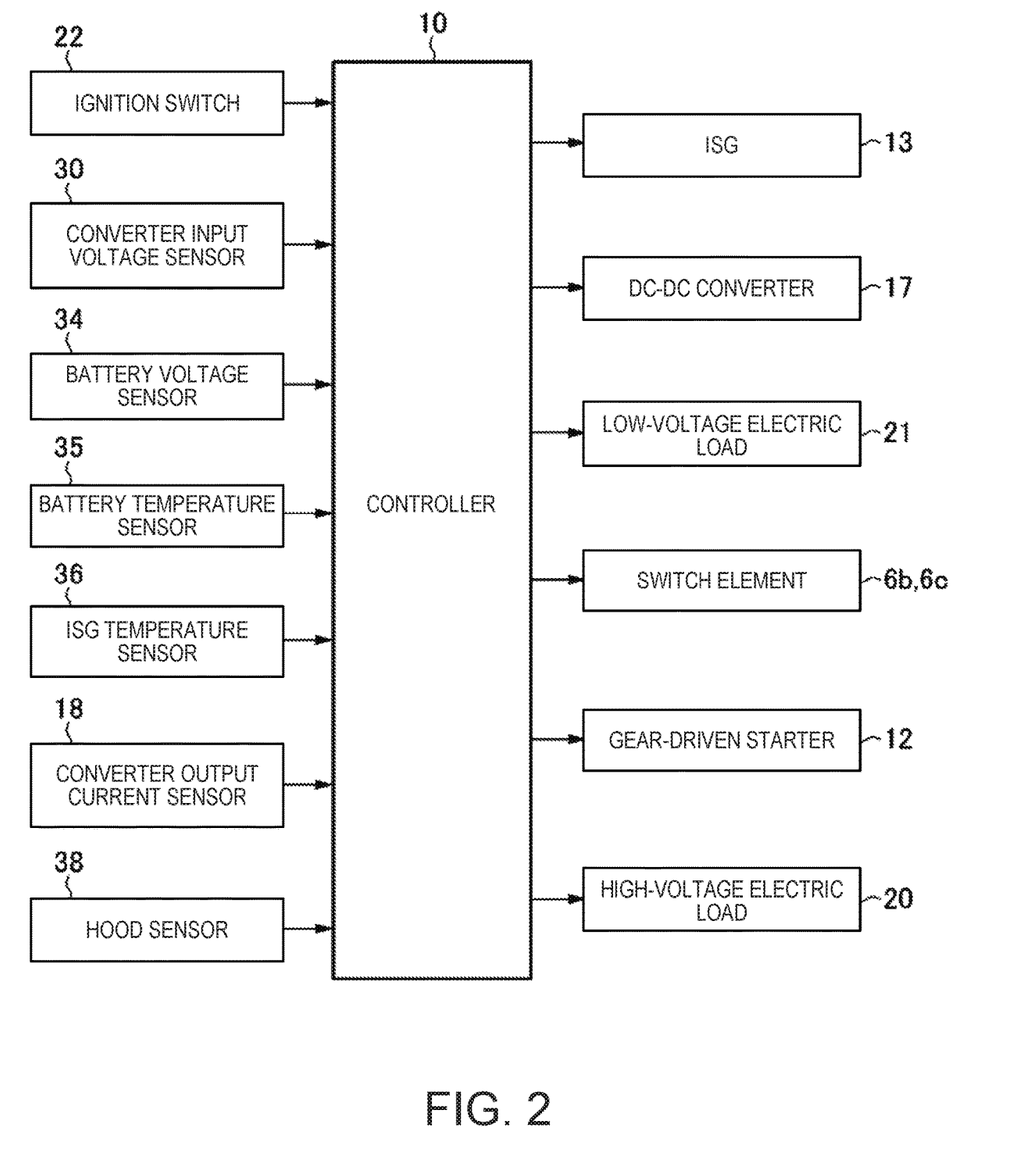
FIG. 2 is a block diagram schematically illustrating an electrical configuration of the power control device for the vehicle according to this embodiment of the present disclosure.

Next, referring to FIG. 2, an electrical configuration of the power control device according to this embodiment of the present disclosure is described. FIG. 2 is a block diagram schematically illustrating the electrical configuration of the power control device according to this embodiment of the present disclosure.

In this embodiment, the hybrid vehicle 1 is controlled by a controller 10 as illustrated in FIG. 2. This controller 10 is comprised of a computer provided with one or more processors, various kinds of programs interpreted and executed by the processor (including a primary control program, such as operating system (OS), and application program(s) which is activated on the OS to implement specific function(s)), and internal memory, such as ROM and RAM, which store the program(s) and various kinds of data.

In detail, as illustrated in FIG. 2, the controller 10 mainly accepts inputs of detection signals corresponding to parameters detected by the ignition switch 22, a converter input voltage sensor 30, a battery voltage sensor 34, a battery temperature sensor 35, an ISG temperature sensor 36, the converter output current sensor 18, and an engine hood sensor 38. The ignition switch 22 outputs a state of the ignition switch 22 to the controller 10. The converter input voltage sensor 30 detects an input voltage of the DC-DC converter 17. The battery voltage sensor 34 detects terminal voltages of the high-voltage battery 14 and the low-voltage battery 19. The battery temperature sensor 35 detects temperature of the low-voltage battery 19. The ISG temperature sensor 36 detects temperature of the ISG 13.

The converter output current sensor 18 detects the current outputted from the DC-DC converter 17. The hood sensor 38 outputs a detection signal indicative of whether a hood of the vehicle 1 is in an open state or a closed state.

Moreover, the controller 10 outputs respective control signals to the ISG 13, the DC-DC converter 17, the gear-driven starter 12, the switch elements 6b and 6c, the high-voltage electric load 20, and the low-voltage electric load 21 based on the detection signals from the respective sensors 18, 30, 34, 35, 36, and 38 described above. Thus, the controller 10 controls the power generation operation and electrically driving operation of the ISG 13, the voltage lowering operation by the DC-DC converter 17, the driving and suspension of the high-voltage electric load 20, the low-voltage electric load 21, and the gear-driven starter 12, and ON/OFF of the switch elements 6b and 6c.

Typically, the controller 10 executes, by using at least the ISG 13, a plurality of controls defined according to the operating state of the hybrid vehicle 1 for the purpose of improving fuel efficiency, etc. The plurality of controls include an acceleration assist control for generating power from the ISG 13 to assist the acceleration by the engine 11 when the hybrid vehicle 1 accelerates, a slowdown regeneration control for regenerating power by the ISG 13 when the hybrid vehicle 1 slows down, a non-generating control for inhibiting power generation by the ISG 13 for supplying the power to the high-voltage electric load 20 and the low-voltage electric load 21 when a given condition (e.g., a situation to prevent an increase in the load of the engine 11 due to the power generation by the ISG 13) is satisfied, and an idling stop control for automatically stopping the engine 11 when the hybrid vehicle 1 stops and for generating power from the ISG 13 to restart the engine 11 when the hybrid vehicle 1 then departs.

Further, the controller 10 executes a control for operating each of the high-voltage electric load 20 and the low-voltage electric load 21. In detail, when operating the high-voltage electric load 20, the controller 10 executes a control for supplying at least one of the power generated by the ISG 13 and the power charged in the high-voltage battery 14 to the high-voltage electric load 20. On the other hand, when operating the low-voltage electric load 21, the controller 10 executes a control for supplying to the low-voltage electric load 21 at least one of the power charged in the high-voltage battery 14 and lowered in the voltage by the DC-DC converter 17, and the power charged in the low-voltage battery 19.

Note that "the power control device" according to this embodiment of the present disclosure is mainly comprised of the ISG 13 as a "generator," the high-voltage battery 14, the low-voltage battery 19, the DC-DC converter 17 as a "voltage converter," and the controller 10.

Figure 3A:
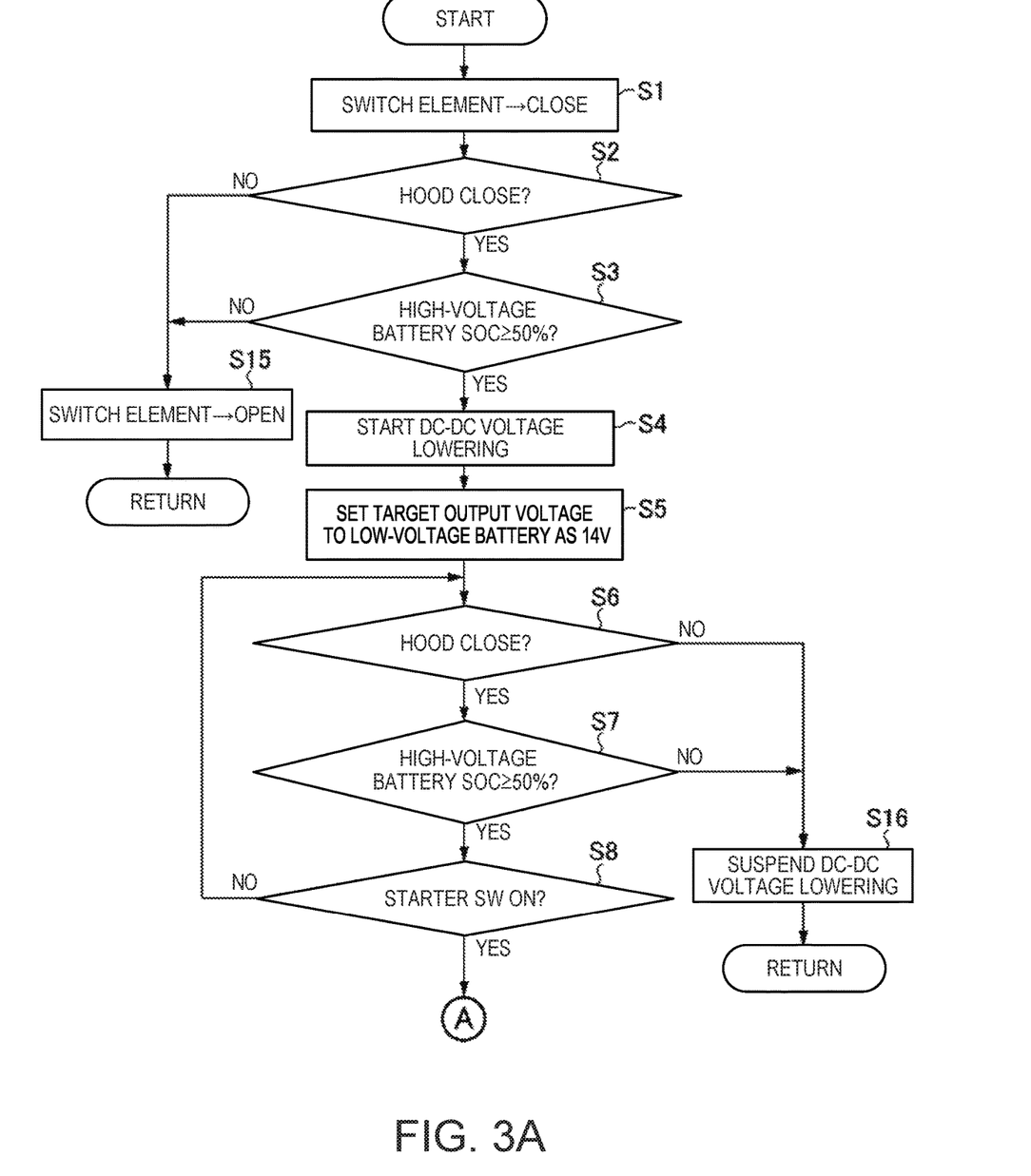
FIGS. 3A and 3B illustrate a flowchart of operation of the power control device for the vehicle according to this embodiment of the present disclosure.
Figure 3B:
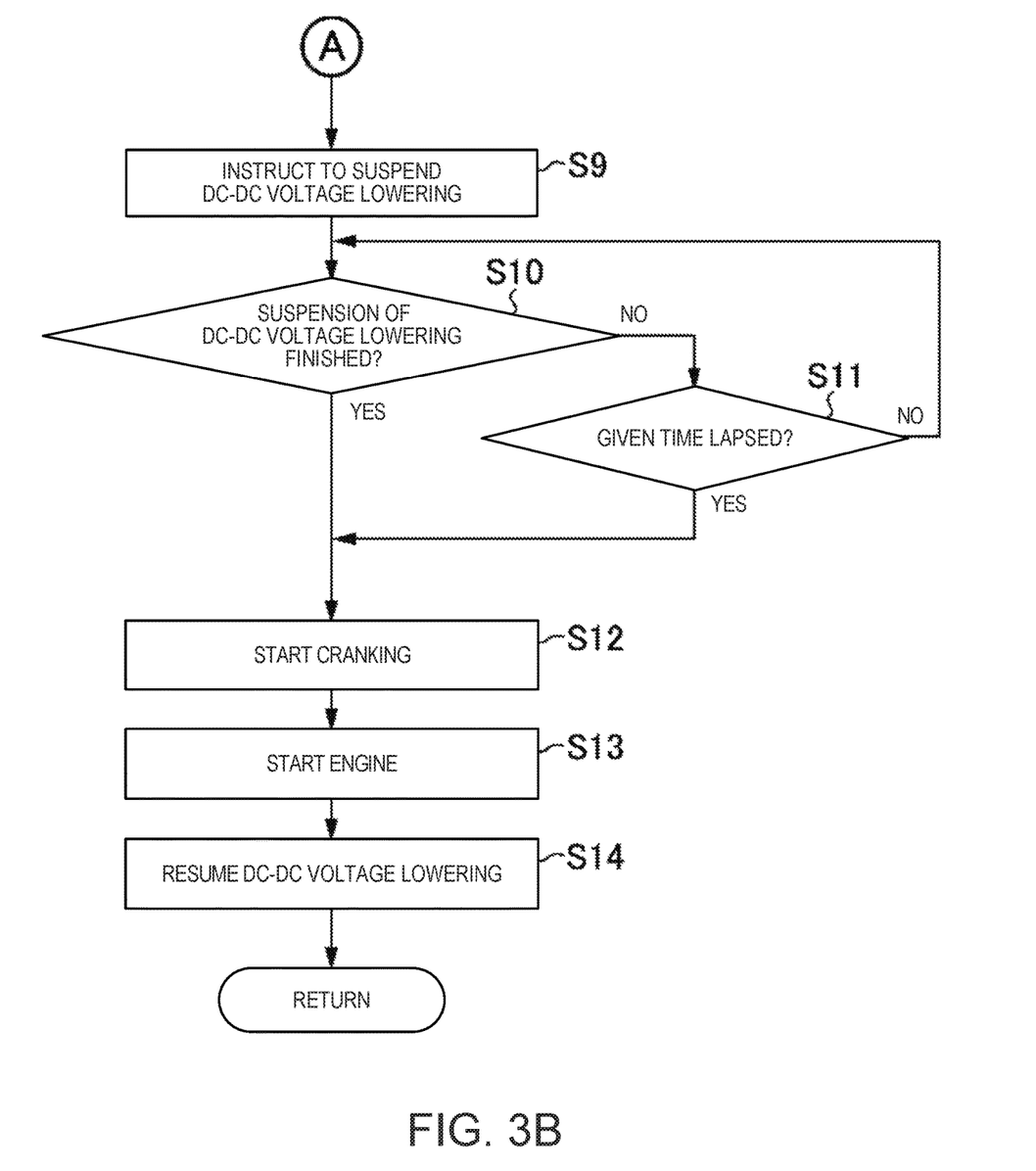
Figure 4:
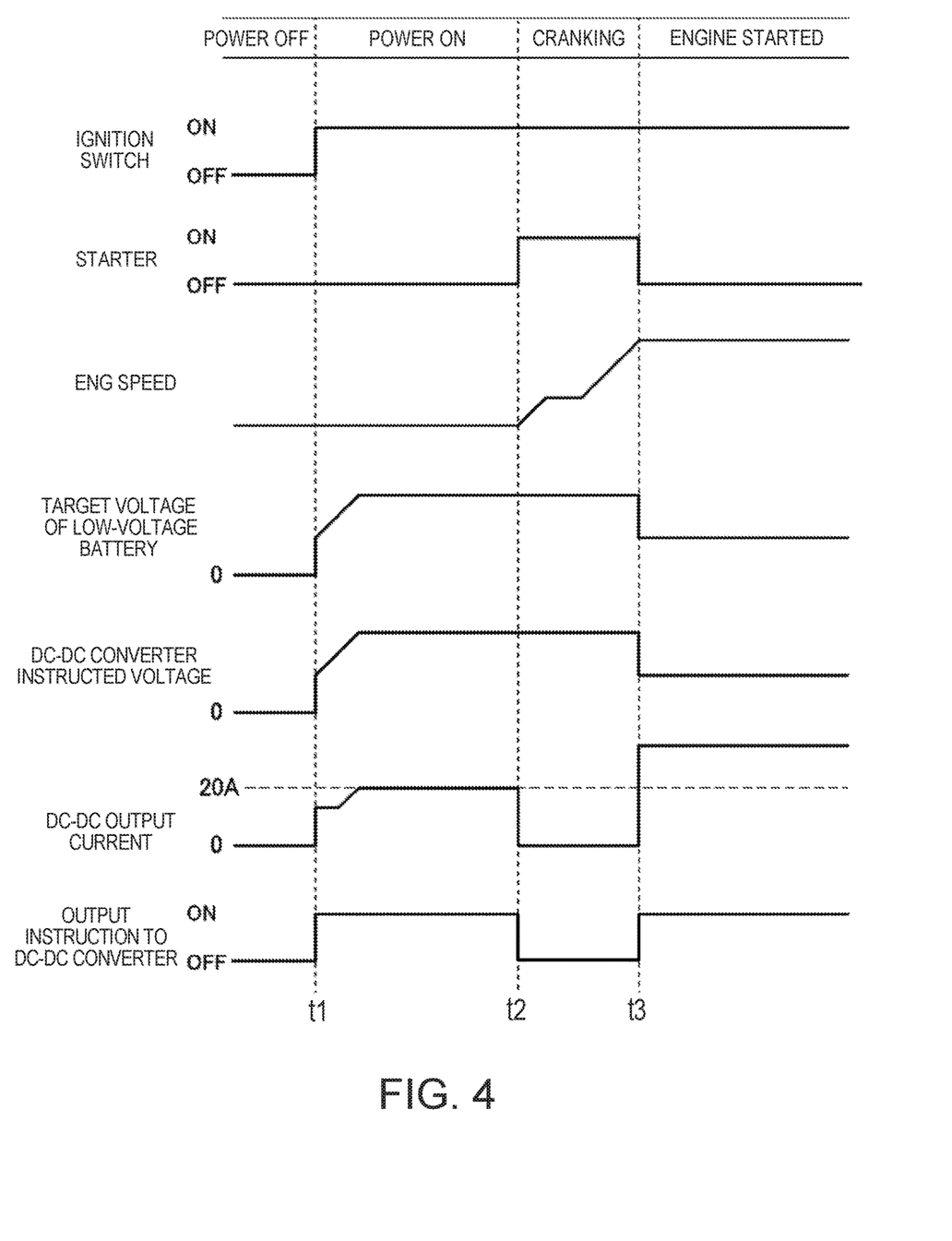
FIG. 4 is a time chart illustrating operation of the power control device for the vehicle according to this embodiment of the present disclosure.

Next, referring to FIGS. 3A and 3B, and 4, operation of the power control device according to this embodiment of the present disclosure is described. FIGS. 3A and 3B illustrate a flowchart of operation of the power control device according to this embodiment of the present disclosure. FIG. 4 is a time chart illustrating the operation of the power control device according to this embodiment of the present disclosure.

The flowchart illustrated in FIGS. 3A and 3B illustrates control processing of the DC-DC converter 17 executed by the controller 10 immediately after the hybrid vehicle 1 is powered ON. The time chart of FIG. 4 illustrates one example of the operation of the power control device immediately after the hybrid vehicle 1 is powered ON. In FIG. 4, a state of the ignition switch 22, a state of the gear-driven starter 12, an engine speed, a target voltage of the low-voltage battery 19, an instructed voltage to the DC-DC converter 17, output current of the DC-DC converter 17, and an output instruction of the DC-DC converter 17 are sequentially illustrated from the top.

First, when the hybrid vehicle 1 is powered ON, the flowchart illustrated in FIGS. 3A and 3B is executed by the controller 10. In the time chart illustrating one example in FIG. 4, the hybrid vehicle 1 is powered ON at a time $t_1$. Note that the phrase "the vehicle is powered ON" as used herein means that the electric apparatus(es) (the high-voltage electric load 20 and/or the low-voltage electric load 21) mounted on the vehicle is made into a usable state. In this embodiment, the ignition switch 22 can be turned ON by a key operation, and the vehicle can be powered ON by rotating a key from the "Lock" position to the "ACC (accessory power ON) position," or to the "ON (ignition power ON) position." Moreover, in a push start button type vehicle, the vehicle can be powered ON by pushing a start button once (accessory power ON) or twice (ignition power ON), for example.

At Step S1 of the flowchart illustrated in FIG. 3A, the switch element 6c is switched to the position of CLOSE. That is, the controller 10 sends the control signal to the switch element 6c to switch the switch element 6c, which is a relay device, to the CLOSE position so that the high-voltage battery 14 is connected to the ISG 13 which is a generator, and the high-voltage battery 14 is connected to the DC-DC converter 17.

Next, at Step S2, the controller 10 determines whether the hood (not illustrated) of the hybrid vehicle 1 is in an open state or a closed state based on the detection signal transmitted from the hood sensor 38. If the hood is closed, the controller 10 shifts to Step S3, and on the other hand, if the hood is opened, the controller 10 shifts to Step S15.

At Step S15, the switch element 6c is again switched to the OPEN position, and the controller 10 ends the processing of the flowchart illustrated in FIGS. 3A and 3B in the state where the DC-DC converter 17 is disconnected from the high-voltage battery 14. That is, it is assumed in the state where the hood is opened that the maintenance of the hybrid vehicle 1 is performed. However, for example, in a state where the high-voltage battery 14 is connected to the DC-DC converter 17 and the low-voltage battery 19 is charged through the DC-DC converter 17 controlled by the controller 10, an update of the control program etc. of the controller 10 cannot be performed. Therefore, when the hood is opened, the controller 10 switches the switch element 6c to the OPEN position so that various maintenances are possible.

On the other hand, in the time chart illustrated in FIG. 4, since the hood is not opened, the controller 10 shifts the processing in the flowchart to Step S3, where it determines an amount of charge (SOC: State of Charge) of the high-voltage battery 14. In detail, the controller 10 estimates the amount of charge of the high-voltage battery 14 based on the terminal voltage of the high-voltage battery 14 detected by the battery voltage sensor 34, and if this amount of charge is 50% or more, the controller 10 shifts to Step S4. On the other hand, if the amount of charge is less than 50%, the controller 10 shifts to Step S15, where it switches the switch element 6c to the OPEN position similar to the case where the hood is open, and then ends the processing of the flowchart illustrated in FIGS. 3A and 3B. That is, if the amount of charge of the high-voltage battery 14 is less than 50%, since the amount of charge of the high-voltage battery 14 may decrease excessively if the output voltage of the high-voltage battery 14 is lowered and the low-voltage battery 19 is charged, processings at and after Step S4 will not be performed.

Next, in the time chart illustrated in FIG. 4, since the amount of charge is 50% or more, the controller 10 shifts to Step S4, where it transmits an instruction signal for starting the lowering of the output voltage of the high-voltage battery 14 to the DC-DC converter 17. That is, at the time $t_1$ of the time chart of FIG. 4, the output instruction of the DC-DC converter 17 is switched from OFF to ON.

Further, at Step S5, the controller 10 sets the target output voltage to be outputted to the low-voltage battery 19 from the DC-DC converter 17 as 14V. That is, the DC-DC converter 17 lowers the voltage of the power outputted from the high-voltage battery 14 based on the instruction signal from the controller 10, and then lets current flow into the low-voltage battery 19 to charge the low-voltage battery 19. Here, if the voltage outputted to the low-voltage battery 19 from the DC-DC converter 17 is low, although power is supplied to the low-voltage electric load 21, the charging current does not substantially flow to the low-voltage battery 19, and therefore, the low-voltage battery 19 is not charged.

In this embodiment, by outputting the voltage of 14V from the DC-DC converter 17 to the low-voltage battery 19 of the 12V nominal voltage to supply the charging current to the low-voltage battery 19 and charge the low-voltage battery 19. Moreover, in the time chart of FIG. 4, when the power is turned ON at the time $t_1$, the instructed voltage of the DC-DC converter 17 is raised, and the target terminal voltage of the low-voltage battery 19 is also raised, thereby increasing the output current from the DC-DC converter 17.

Thus, by lowering the output of the high-voltage battery 14 and charging the low-voltage battery 19, the amount of charge of the low-voltage battery 19 increases and the amount of charge of the high-voltage battery 14 decreases. Therefore, even when a large amount of power is regenerated by the ISG 13 during the operation of the hybrid vehicle 1, the high-voltage battery 14 has the capacity to accept this power, and therefore, the regenerated power can be accumulated effectively in the high-voltage battery 14. On the other hand, when the lead battery, etc. is used as the low-voltage battery 19, since a natural electric discharge occurs, the low-voltage battery 19 is not normally in a fully-charged state when the vehicle is powered ON, and therefore, the power from the high-voltage battery 14 can be charged to the low-voltage battery 19.

Next, at Step S6 of FIG. 3A, the controller 10 again determines based on the detection signal transmitted from the hood sensor 38 whether the hood (not illustrated) of the hybrid vehicle 1 is in the open state or the closed state. If the hood is opened, the controller 10 shifts to Step S16, where the lowering of the voltage by the DC-DC converter 17 is suspended, and it then ends the processing of the flowchart illustrated in FIGS. 3A and 3B. That is, even after the lowering of the voltage by the DC-DC converter 17 is started, the lowering of the voltage by the DC-DC converter 17 is suspended when the hood is opened, and the hybrid vehicle 1 is shifted to the state where the maintenance is possible.

Moreover, in this embodiment, when the hood is opened while the DC-DC converter 17 is lowering the voltage, and the voltage lowering is suspended, the voltage lowering will not be resumed even after the hood is again closed. In this case, the lowering of the voltage by the DC-DC converter 17 is resumed after the engine 11 is started. In the time chart illustrated in FIG. 4, since the hood is not opened after the power is turned ON at the time $t_1$, the lowering of the voltage by the DC-DC converter 17 is continued.

Further, at Step S7, the controller 10 determines an amount of charge of the high-voltage battery 14. In detail, the controller 10 estimates the amount of charge of the high-voltage battery 14 based on the terminal voltage of the high-voltage battery 14, and if the amount of charge is 50% or more, the controller 10 shifts to Step S8. On the other hand, if the amount of charge is less than 50%, the controller 10 shifts to Step S16, where it suspends the lowering of the voltage by the DC-DC converter 17 similar to the case where the hood is opened, and ends the processing of the flowchart illustrated in FIGS. 3A and 3B. That is, even after the charging of the low-voltage battery 19 from the high-voltage battery 14 is started, the charging of the low-voltage battery 19 is stopped when the amount of charge of the high-voltage battery 14 decreases to less than 50%. Therefore, an excessive decrease in the amount of charge of the high-voltage battery 14 is prevented. In the time chart illustrated in FIG. 4, since the amount of charge of the high-voltage battery 14 is not decreased to less than 50% after the charging of the low-voltage battery 19 is started at the time $t_1$, the lowering of the voltage by the DC-DC converter 17 is continued.

Next, at Step S8 of FIG. 3A, the controller 10 determines whether the starter switch of the engine 11 is turned ON, and if turned ON, the controller 10 shifts to Step S9 of FIG. 3B, and on the other hand, if not turned ON, it returns to Step S6. That is, in the flowchart of FIG. 3A, after the lowering of the voltage by the DC-DC converter 17 is started, processings at Steps S6→S7→S8→S6 are repeated until the starter switch is turned ON. In this embodiment, the starter switch of the engine 11 is turned ON by rotating the ignition switch 22 of the vehicle to the "START" position from the "ON" position.

After the charging of the low-voltage battery 19 is started at the time $t_1$ of FIG. 4, the charging current to the low-voltage battery 19 and the current supplied to the low-voltage electric load 21 are outputted through the DC-DC converter 17. Here, if the amount of charge of the low-voltage battery 19 is small, or if the low-voltage electric load 21 with a large power consumption is operated, the output current from the DC-DC converter 17 increases. However, even when a large output current is required for the DC-DC converter 17, the output current from the DC-DC converter 17 is kept at less than or equal to a given first current. Note that although the output current from the DC-DC converter 17 is kept at less than or equal to a given maximum current during the operation of the engine 11, the first current set before the engine 11 is started is set at a current that is less than the maximum current.

That is, when the large output current is taken out from the DC-DC converter 17, the temperature of the DC-DC converter 17 increases, and if the large current is continuously taken out and the temperature increases to a given value, the output of current is suspended in order to protect the circuit components of the DC-DC converter 17. Therefore, if the large current is drawn before the engine 11 is started and the temperature of the DC-DC converter 17 is greatly raised, the required power may become impossible to be drawn from the DC-DC converter 17 during the operation of the engine 11. In order to avoid this effect, the output current is controlled to the first current that is less than the maximum current before the engine 11 is started. In this embodiment, the first current is set as 20A, and when the output current reaches 20A, the output voltage of the DC-DC converter 17 is lowered to decrease the charging current to the low-voltage battery 19.

On the other hand, in the time chart illustrated in FIG. 4, after the charging of the low-voltage battery 19 is started at the time $t_1$, processings at Steps S6→S7→S8→S6 are repeated, and the starter switch is then turned ON at a time $t_2$.

When the starter switch is turned ON, the controller 10 shifts the processing in the flowchart to Step S9 of FIG. 3B, where it suspends the lowering of the voltage by the DC-DC converter 17. That is, the controller 10 transmits the control signal to the DC-DC converter 17 to suspend the lowering of the voltage by the DC-DC converter 17.

Next, at Step S10, the controller 10 determines whether the suspension processing of the DC-DC converter 17 is finished. That is, when the suspension processing is finished, the DC-DC converter 17 into which the control signal for suspension the voltage lowering is inputted from the controller 10 returns to the controller 10 a signal indicating that the suspension processing is finished. When the signal indicating that the suspension processing is finished is received from the DC-DC converter 17, the controller 10 determines that the suspension processing of the DC-DC converter 17 is finished. If the suspension processing is finished, the controller 10 shifts to Step S12, and on the other hand, if the suspension processing is not finished, the controller 10 shifts to Step S11.

At Step S11, the controller 10 determines whether a given time is lapsed after the control signal is transmitted to the DC-DC converter 17 at Step S9, and if the given time is lapsed, the controller 10 shifts to Step S12, and on the other hand, if the given time is not lapsed, it returns to Step S10. By this processing, if the signal indicating that the suspension processing is finished is inputted from the DC-DC converter 17 or if the given time is lapsed after the control signal is transmitted at Step S9, the controller 10 executes the processing at Step S12. Therefore, even when the signal indicating that the suspension processing is finished is not received because of a certain reason, the controller 10 can certainly execute the processings at and after Step S12.

Next, at Step S12, the controller 10 drives the gear-driven starter 12 to crank the engine 11. In the time chart of FIG. 4, the ignition switch 22 is rotated to the "START" position at the time $t_2$ (or the starter switch is operated to be "ON"). In connection with this, the controller 10 switches the output instruction to the DC-DC converter 17 to "OFF," and makes the output current of the DC-DC converter 17 to zero. Moreover, by the gear-driven starter 12 being driven, the rotating speed of the output shaft 9 of the engine 11 increases.

Further, when the engine 11 is started at Step S13, the controller 10 resumes the lowering of the voltage by the DC-DC converter 17 at Step S14, and then ends the processing of the flowchart illustrated in FIGS. 3A and 3B. In the time chart of FIG. 4, after the gear-driven starter 12 is driven at the time $t_2$, the controller 10 starts the engine at a time $t_3$. In connection with this, the controller 10 switches the output instruction to the DC-DC converter 17 to "ON" to resume the current output from the DC-DC converter 17. Note that after the engine 11 is started, the controller 10 sets the output current from the DC-DC converter 17 based on the output currents required for the high-voltage battery 14 and the low-voltage battery 19, the amount of charge of these batteries, etc. Moreover, after the engine 11 is started, the output current from the DC-DC converter 17 is restricted to current below the given maximum current set larger than the first current (20A).

Note that in the time chart of FIG. 4, while the cranking is performed from the time $t_2$ to the time $t_3$, the output instruction to the DC-DC converter 17 is turned "OFF," and the low-voltage battery target voltage and the DC-DC converter instructed voltage are maintained at the values before the cranking is started. Thus, in the power control device of this embodiment, if the output instruction to the DC-DC converter 17 is turned "OFF," the output current from the DC-DC converter 17 is set to zero, regardless of the target voltage or the instructed voltage. Alternatively, the present disclosure may be configured so that the low-voltage battery target voltage and the DC-DC converter instructed voltage are lowered or set to zero corresponding to the output instruction to the DC-DC converter 17. Alternatively, the present disclosure may also be configured so that the charging of the low-voltage battery 19 is suspended by reducing the low-voltage battery target voltage and the DC-DC converter instructed voltage or setting them to zero, while maintaining the output instruction to the DC-DC converter 17 at "ON."

According to the power control device of this embodiment of the present disclosure, since the DC-DC converter 17 is operated and the charging of the low-voltage battery 19 is started after the vehicle 1 is powered ON (after the time $t_1$ of FIG. 4) and before the engine 11 mounted on the vehicle 1 is started (before the time $t_3$ of FIG. 4), the low-voltage battery 19 can be prevented from being insufficiently charged, even if the low-voltage electric load 21 is used for a comparatively long period of time before the engine startup. Moreover, according to the power control device of this embodiment, before the mounted engine 11 is started, the DC-DC converter 17 is operated and the output voltage from the high-voltage battery 14 is lowered to charge the low-voltage battery 19. Therefore, even when the high-voltage battery 14 is fully-charged, the high-voltage battery 14 still has the capacity to be charged when starting the engine and it becomes possible to charge the high-voltage battery 14 with the power regenerated during the operation of the vehicle 1, thereby effectively utilizing the regenerated power.

Moreover, according to the power control device of this embodiment, while the vehicle 1 is powered ON, if the voltage of the high-voltage battery 14 is below the given voltage, since the charging of the low-voltage battery 19 by the DC-DC converter 17 is not started (Steps S3→S15 of FIG. 3A), the high-voltage battery 14 being insufficiently charged due to charging the low-voltage battery 19 can be avoided.

Further, according to the power control device of this embodiment, after the vehicle 1 is powered ON and before the engine is started, since the output current from the DC-DC converter 17 is restricted to or below the given first current which is lower than the maximum current, the temperature of the DC-DC converter 17 excessively increasing before the engine is started can be prevented. Therefore, it can be prevented that it becomes impossible to supply the required current from the DC-DC converter 17 during the operation of the vehicle 1 after the engine 11 is started.

Moreover, according to the power control device of this embodiment, in the state where the cranking is performed (from the time $t_2$ to the time $t_3$ of FIG. 4), since the charging of the low-voltage battery 19 from the high-voltage battery 14 is suspended, it can be prevented that the current is excessively drawn from the high-voltage battery 14 and the excessive voltage drop, etc. occurs.

Further, according to the power control device of this embodiment, when the open state of the hood is detected by the hood sensor 38 (Step S2→S15 of FIG. 3A), since the switch element 6c which switches the connection/disconnection of the DC-DC converter 17 to the high-voltage battery 14 is switched to the disconnected state (Step S15 of FIG. 3A), it can be prevented that the maintenance of the vehicle 1 is impeded.

As described above, although the desirable embodiment of the present disclosure is described, various changes may be made to the above embodiment. Particularly, in the above embodiment, although the power control device of the present disclosure is applied to the hybrid vehicle, the present disclosure is also applicable to vehicles other than the hybrid vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Hybrid Vehicle
2 Transmission
3 Reduction Gear
4 Drive Shaft
5 Wheel
6a Resistor
6b, 6c Switch Element (Relay Device)
7 Brake System
8 Belt
9 Output Shaft
10 Controller
11 Engine
12 Gear-driven Starter
13 ISG (Generator)
14 High-Voltage Battery
17 DC-DC Converter (Voltage Converter)
18 Converter Output Current Sensor (Current Sensor)
19 Low-voltage Battery
20 High-voltage Electric Load
21 Low-voltage Electric Load
22 Ignition Switch
23 Converter Input Voltage Sensor
30 Battery Voltage Sensor
34 Battery Temperature Sensor
35 ISG Temperature Sensor
36 Hood Sensor

What is claimed is:
1. A power control device for a power supply mounted on a vehicle, the power control device comprising:

a generator mounted on the vehicle and configured to regenerate power from kinetic energy of the vehicle;
a high-voltage battery configured to accumulate the power regenerated by the generator;
a low-voltage battery of which a nominal voltage is lower than the high-voltage battery;
a voltage converter configured to lower an output voltage from the high-voltage battery and charge the low-voltage battery at the lowered voltage;
a controller configured to control the voltage converter, the controller operating the voltage converter to start the charging of the low-voltage battery after the vehicle is powered ON and before an engine mounted on the vehicle is started;
a relay device configured to switch between a connected state and a disconnected state of the high-voltage battery and the voltage converter; and
a hood sensor configured to detect an open state and a closed state of a hood of the vehicle,
wherein the controller switches the relay device to the disconnected state or maintains the relay device in the disconnected state, when the open state of the hood is detected by the hood sensor after the vehicle is powered ON.

2. The power control device of claim 1, wherein the controller inhibits the voltage converter from starting the charging of the low-voltage battery, when the voltage of the high-voltage battery is below a given voltage while the vehicle is powered ON.

3. The power control device of claim 1, wherein the controller controls the voltage converter so that an output current from the voltage converter becomes below a given maximum current after the engine is started, and restricts the output current below a given first current lower than the maximum current after the vehicle is powered ON and before the engine is started.

4. The power control device of claim 1, wherein the controller controls the voltage converter so that the charging of the low-voltage battery from the high-voltage battery is suspended while cranking is performed after the vehicle is powered ON.

5. The power control device of claim 1, wherein the controller increases a target voltage when operating the voltage converter to charge the low-voltage battery after the vehicle is powered ON and before the engine is started.

6. A method of controlling a power supply for a vehicle, comprising the steps of:
regenerating power from kinetic energy of the vehicle;
accumulating the regenerated power in a high-voltage battery having a higher nominal voltage than a low-voltage battery;
lowering, by a voltage converter, an output voltage from the high-voltage battery and charging the low-voltage battery at the lowered voltage;
controlling the voltage converter to start the charging of the low-voltage battery after the vehicle is powered ON and before an engine mounted on the vehicle is started; and
switching a relay device to a disconnected state disconnecting the high-voltage battery from the voltage converter, or maintaining the relay device in the disconnected state disconnecting the high-voltage battery from the voltage converter, when an open state of a hood is detected by a hood sensor after the vehicle is powered ON.

7. The method of claim 6, wherein the voltage converter is inhibited from starting the charging of the low-voltage battery, when the voltage of the high-voltage battery is below a given voltage while the vehicle is powered ON.

8. The method of claim 6, wherein the voltage converter is controlled so that the charging of the low-voltage battery from the high-voltage battery is suspended while cranking is performed after the vehicle is powered ON.

9. The method of claim 6, wherein a target voltage is increased when operating the voltage converter to charge the low-voltage battery after the vehicle is powered ON and before the engine is started.

10. A power control device for a power supply mounted on a vehicle, the power control device comprising:
a generator mounted on the vehicle and configured to regenerate power from kinetic energy of the vehicle;
a high-voltage battery configured to accumulate the power regenerated by the generator;
a low-voltage battery of which a nominal voltage is lower than the high-voltage battery;
a voltage converter configured to lower an output voltage from the high-voltage battery and charge the low-voltage battery at the lowered voltage; and
a controller configured to control the voltage converter, the controller operating the voltage converter to start the charging of the low-voltage battery after the vehicle is powered ON and before an engine mounted on the vehicle is started,
wherein the controller controls the voltage converter so that a target terminal voltage of the low-voltage battery is raised to increase an output current from the voltage converter to become a first value below a given maximum current after the engine is started, and lowers the output current to be a second value below the first value after the vehicle is powered ON and before the engine is started.

11. The power control device of claim 10, wherein the controller inhibits the voltage converter from starting the charging of the low-voltage battery, when the voltage of the high-voltage battery is below a given voltage while the vehicle is powered ON.

12. The power control device of claim 10, wherein the controller controls the voltage converter so that the charging of the low-voltage battery from the high-voltage battery is suspended while cranking is performed after the vehicle is powered ON.

13. The power control device of claim 10, wherein the controller increases a target voltage when operating the voltage converter to charge the low-voltage battery after the vehicle is powered ON and before the engine is started.

* * * * *